United States Patent [19]

Okuyama et al.

[11] Patent Number: 4,704,238

[45] Date of Patent: Nov. 3, 1987

[54] PROCESS FOR THE PRODUCTION OF AIR-PERMEABLE FILMS

[75] Inventors: Katsumi Okuyama; Hiroyasu Mizutani, both of Mie, Japan

[73] Assignee: Mitsubishi Petrochemical Co., Ltd., Tokyo, Japan

[21] Appl. No.: 798,609

[22] Filed: Nov. 15, 1985

[30] Foreign Application Priority Data

Nov. 19, 1984 [JP] Japan .................................. 59-244185

[51] Int. Cl.$^4$ ...................... B29C 67/20; B29C 55/10; B29C 55/12; B29C 55/28
[52] U.S. Cl. ........................................ 264/41; 264/565; 264/567; 264/210.7; 264/211; 264/288.8; 264/290.2; 264/DIG. 13
[58] Field of Search ................. 264/41, DIG. 13, 565, 264/567, 210.7, 288.8, 290.2, 211

[56] References Cited

U.S. PATENT DOCUMENTS

| | | | |
|---|---|---|---|
| 3,154,461 | 10/1964 | Johnson | 264/DIG. 13 |
| 3,539,666 | 11/1970 | Schirmer | 425/4 C X |
| 3,679,538 | 7/1972 | Druin et al. | 264/41 X |
| 3,823,210 | 7/1974 | Hikaru Shii et al. | 264/41 |
| 3,843,761 | 10/1974 | Bierenbaum et al. | 264/41 X |
| 3,862,030 | 1/1975 | Goldberg | 264/41 X |
| 4,472,328 | 2/1984 | Sugimoto et al. | 264/41 |
| 4,585,604 | 4/1986 | Okuyama et al. | 264/41 |

Primary Examiner—Philip Anderson
Attorney, Agent, or Firm—Oblon, Fisher, Spivak, McClelland, & Maier

[57] ABSTRACT

A process for producing an air-permeable film is described, comprising stretching in at least one direction a film made of a composition comprising 42 to 87 vol % of a polyolefin resin and 58 to 13 vol % of an inorganic filler and further containing an aliphatic alcohol/fatty acid ester of a fatty acid having 10 to 22 carbon atoms and an aliphatic alcohol having 1 to 12 carbon atoms in an amount of 3 to 25 parts by weight per 100 parts by weight of the above composition.

20 Claims, 2 Drawing Figures

PROCESS FOR THE PRODUCTION OF AIR-PERMEABLE FILMS

FIELD OF THE INVENTION

The present invention relates to a process for the production of an air-permeable film which comprises stretching a film made of a composition comprising a polyolefin resin and an inorganic filler. More particularly, it is concerned with a process for the production of an air-permeable film having good soft touch, which is suitable for use as a sanitary material such as a disposable diaper and a sanitary napkin.

BACKGROUND OF THE INVENTION

Many methods have been proposed to produce an air-permeable film by stretching, uniaxially or biaxially, a film made of a composition comprising a polyolefin resin and an inorganic filler, thereby introducing a number of open voids into the stretched film. It has been started to apply such air-permeable films to sanitary materials such as disposable diapers and sanitary napkins.

This air-permeable film, however, possesses stiffness due to molecular orientation of the polyolefin resin by stretching. Thus, it is unsuitable for use in applications requiring soft touch like cloth because of its stiffness.

In order to provide the air-permeable film with soft touch, it may be considered to use a resin composition which is of low stiffness, i.e., soft. For example, a method of compounding a liquid polymer has been proposed. In accordance with this method, however, an air-permeable film having satisfactory soft touch has not yet been obtained, but the film becomes excessively adhesive.

It is also considered effective to control a degree of orientation by decreasing a stretching ratio, and to decrease the thickness of the film. When, however, a film made of a composition comprising a polyolefin resin and an inorganic filler is stretched to produce an air-permeable film, if the stretching ratio is decreased, local necking occurring at the start of stretching remains in the stretched film product and thus the stretched film is of low thickness evenness. This tendency becomes more marked when the thickness of the film is decreased.

In accordance with the conventional method of producing an air-permeable film by stretching a film made of a composition comprising a polyolefin resin and an inorganic filler, an air-permeable film having soft touch and a decreased and uniform thickness has not yet been produced particularly at a low stretching ratio.

SUMMARY OF THE INVENTION

The present invention is intended to overcome the above problems.

The present invention relates to a process for producing an air-permeable film by stretching in at least one direction a film made of a composition comprising 42 to 87 vol % of a polyolefin resin and 58 to 13 vol % of an inorganic filler wherein an aliphatic alcohol/fatty acid ester of a fatty acid having 10 to 22 carbon atoms and an aliphatic alcohol having 1 to 12 carbon atoms is further compounded to the above composition in an amount of 3 to 25 parts by weight per 100 parts by weight of the composition.

DETAILED DESCRIPTION OF THE INVENTION

Figure 1:
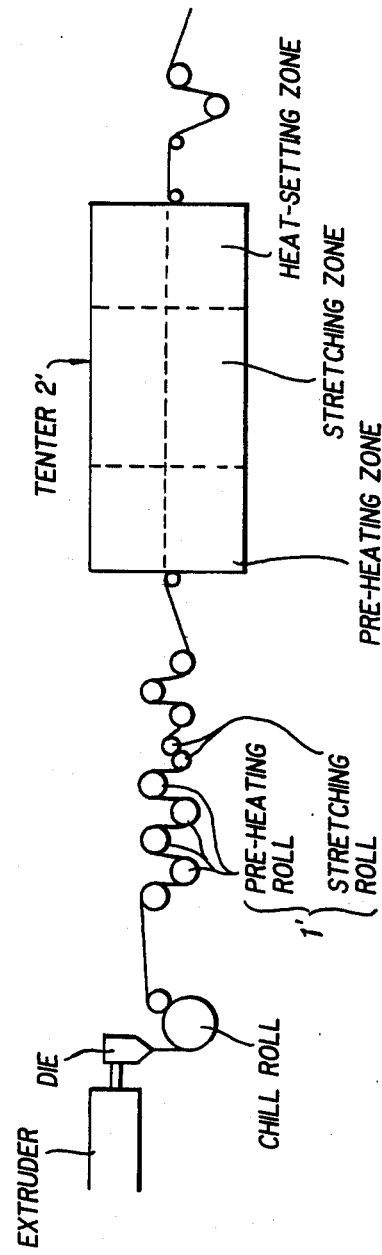
Figure 2:
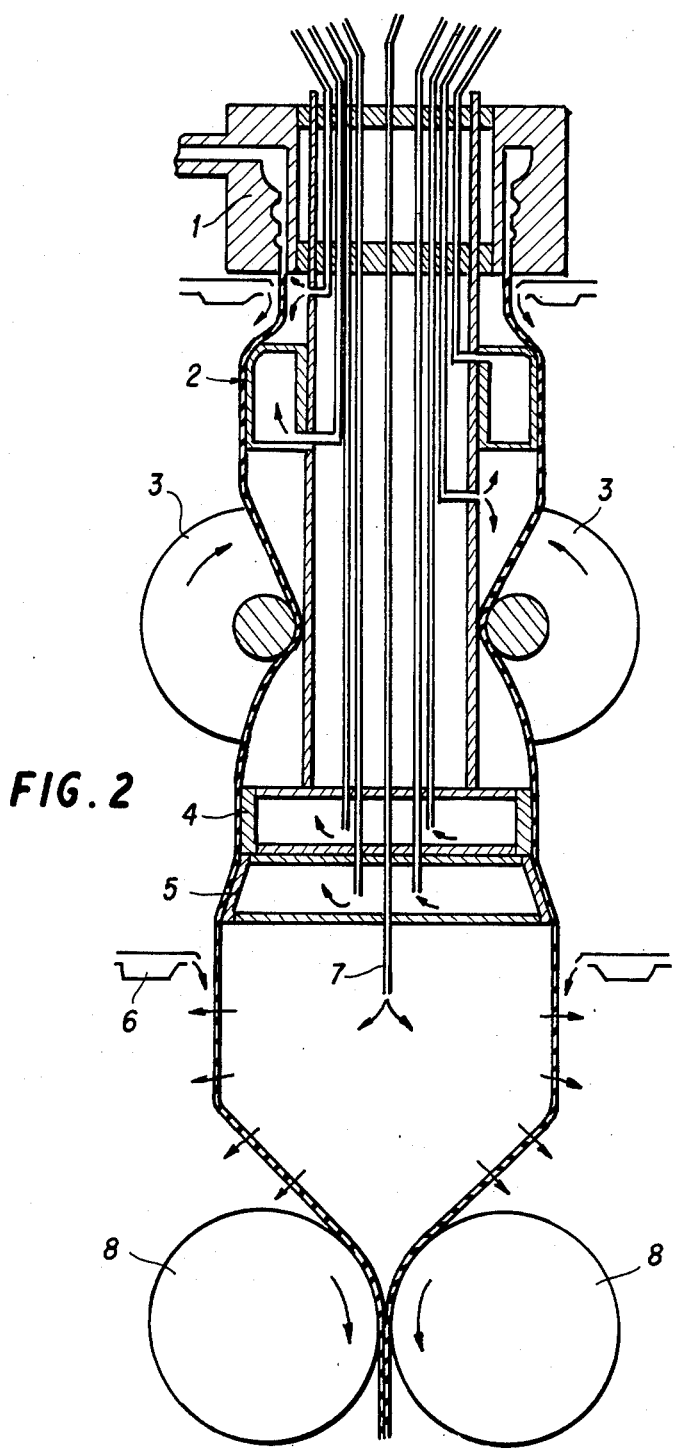

The polyolefin resin as used herein includes low density polyethylene, high density polyethylene, polypropylene, and an ethylene-α-olefin copolymer such as an ethylene-propylene copolymer, an ethylene-butene-1 copolymer and an ethylene-propylene-butene-1 copolymer. These polymers may be used alone or in combination with each other. Of these polymers, an ethylene-α-olefin copolymer and a mixture composed mainly of the copolymer are preferred. In this ethylene-α-olefin copolymer, the density is 0.910 to 0.940 g/cm$^3$ and preferably 0.916 to 0.935 g/cm$^3$, and the melt flow rate (hereinafter abbreviated to MFR) is 0.1 to 5 g/10 min and preferably 0.1 to 3 g/10 min. If the density of the ethylene-α-olefin copolymer is less than 0.910 g/cm$^3$, uniform stretching cannot be performed. On the other hand, if it is in excess of 0.940 g/cm$^3$, the soft touch of the stretched film is reduced. If the MFR is less than 0.1 g/10 min, abnormal flow occurs when the film is melt extruded through a die clearance and thus an even film cannot be obtained. On the other hand, if it is in excess of 5 g/10 min, uniform stretching is performed limitedly.

The ethylene-α-olefin copolymer is a straight chain low density ethylene copolymer comprising 1 to 20 wt %, preferably 3 to 15 wt % of an α-olefin having a $C_3$–$C_8$ molecular skeleton and 99 to 80 wt %, preferably 97 to 85 wt % of ethylene, which is prepared by copolymerizing ethylene and at least one α-olefin having a $C_3$–$C_8$ molecular skeleton in the presence of a catalyst comprising a transition metal compound and an organometallic compound. The ethylene-α-olefin copolymer is different in molecular structure, melt properties, crystallization properties, solid physical properties and stretching characteristics from (branched chain) low density polyethylene which is commonly produced by polymerizing ethylene by the radical reaction under elevated pressure in the presence of an oxygen radical initiator.

The high density polyethylene that is suitable for use in the present invention has a density of at least 0.941 g/cm$^3$, preferably at least 0.945 g/cm$^3$ and an MFR of not more than 1.0 g/10 min, preferably not more than 0.9 g/10 min.

The low density polyethylene that is suitable for use in the present invention has a density of 0.910 to 0.928 g/cm$^3$ and an MFR of 0.3 to 10 g/10 min.

The polypropylene that is suitable for use in the present invention has an MFR of 0.5 to 10 g/10 min.

Inorganic fillers which can be used in the present invention include calcium carbonate, calcium oxide, talc, clay, silica, titanium oxide, alumina, and aluminum sulfate. These inorganic fillers can be used alone or in combination with each other. These inorganic fillers are preferably in forms other than plate, rod and needle forms, such as spherical, granular and irregular. The average particle size is 0.1 to 5 μm and preferably 0.6 to 3 μm. If the average particle size is less than 0.1 μm, the resulting film cannot be stretched satisfactorily, that is, stretching becomes difficult. On the other hand, if the average particle size exceeds 5 μm, the stretched film has such an uneven surface as to be unsuitable for use as an air-permeable film. Moreover, a stretched film of thickness of not more than 60 μm cannot be continuously produced in a stable manner.

The aliphatic alcohol/fatty acid ester is an ester compound of a fatty acid having 10 to 22 carbon atoms, preferably 12 to 18 carbon atoms and an aliphatic alcohol having 1 to 12 carbon atoms, preferably 1 to 6 carbon atoms. Typical examples of the fatty acid include lauric acid, myristic acid, palmitic acid, stearic acid, oleic acid, linolic acid, linolenic acid, and ricinoleic acid. Typical examples of the aliphatic alcohol include methyl alcohol, ethyl alcohol, butyl alcohol, ethylene glycol, propylene glycol, glycerol, pentaerythritol and sorbitol. Ester compounds derived from the above compounds include ethylene glycol laurate or polyethylene glycol laurate, propylene glycol laurate or polypropylene glycol laurate, glycerol laurate, sorbitan laurate, ethylene glycol sorbitan laurate or polyethylene glycol sorbitan laurate, glycerol myristate, glycerol palmitate, butyl stearate, ethylene glycol stearate or polyethylene glycol stearate, glycerol stearate, butyl oleate, ethylene glycol oleate or polyethylene glycol oleate, propylene glycol oleate or polypropylene glycol oleate, glycerol oleate, pentaerythritol oleate, sorbitan oleate, ethylene glycol sorbitan oleate or polyethylene glycol sorbitan oleate, glycerol linolate, glycerol linolenate, methyl ricinolate, ethyl ricinolate, butyl ricinolate, methylacetyl ricinolate, ethylacetyl ricinolate, butylacetyl ricinolate, ethylene glycol ricinolate or polyethylene glycol ricinolate, glycerol ricinolate, and glycerol acetyl ricinolate. Of these esters, an ester of ricinolic acid as the fatty acid and glycerol as the alcohol is most preferred, that is, glycerol ricinolate and glycerol acetyl ricinolate are most preferred.

In kneading the polyolefin resin, inorganic filler and fatty acid ester, heat kneading using a single screw or twin screw extruder, a Banbury mixer, a kneader, or a mixing roll, for example, can be employed. In this heat kneading, commonly used additives such as a dispersant, a heat stabilizer, an ultraviolet absorber, a lubricant, a pigment and an antistatic agent can be added simultaneously. Particularly, the use of a higher fatty acid having 12 or more carbon atoms as the dispersant produces good results. The inorganic filler may be treated with the dispersant, for example, prior to heat kneading.

The polyolefin resin and the inorganic filler are mixed in such a manner that the polyolefin resin content is 42 to 87 vol %, preferably 55 to 80 vol % and the inorganic filler content is 58 to 13 vol %, preferably 45 to 20 vol %. If the proportion of the inorganic filler is less than 13 vol %, the voids that have been formed in the stretched film as a result of separation of the inorganic filler from the polyolefin resin in the interface thereof do not communicate with each other and fail to ensure air permeability. On the other hand, if the proportion of the inorganic filler is in excess of 58 vol %, the resulting film loses its stretching properties and it becomes difficult to stretch.

The fatty acid ester is compounded in an amount of 3 to 25 parts by weight, preferably 5 to 15 parts by weight, per 100 parts by weight of the composition comprising the polyolefin resin and the inorganic filler. If the amount of the fatty acid ester added is less than 3 parts by weight, uniform stretching of film becomes difficult, and in production of a thin stretched film, it becomes difficult to produce the desired film continuously and in a stable manner. Moreover, the stretched film has decreased soft touch. On the other hand, if the amount of the fatty acid ester added is in excess of 25 parts by weight, extrusion of film becomes unstable and, as a result, an air-permeable film having an even thickness cannot be produced.

In the present invention, the polyolefin resin, the inorganic filler and the fatty acid ester are compounded, the resulting composition is shaped into a film by known extrusion techniques such as flat film extrusion and blown film extrusion, and then the film is stretched uniaxially or biaxially at a temperature commonly used in film stretching.

For this stretching, known techniques can be employed. For example, in the case of uniaxial stretching, roll stretching, oven stretching in a flat form, and tubular stretching can be employed. In the case of biaxial stretching, tenter stretching in a flat form and mandrel stretching in a tubular form can be employed.

The stretching ratio in the present invention is 1.2 to 6 times, preferably 1.5 to 4 times in one direction.

To stabilize the dimensional accuracy of the stretched film, it is usually subjected to heat treatment upon stretched.

The present invention is effective particularly in the tubular stretching method, more specifically in the mandrel biaxial stretching method.

This mandrel stretching method is such that a truncated-conical mandrel, one end of which has a diameter equal to or somewhat smaller than that of a tubular unstretched film and the other end has a diameter nearly equal to a value finally obtained by a stretching ratio in the transverse (circumferential) direction, is fitted in the tubular unstretched film, and the film is stretched by means of being drawn by nip rolls positioned downstream of the mandrel while being guided along tapered side walls of the mandrel, whereby the film is stretched in transverse (circumferential) and longitudinal directions in the state that it is substantially under compressive stress on the surface of the mandrel by the action of force generated when the cooled film is taken up. As a method of supporting the mandrel, it is preferred to fix the end of smaller diameter of the mandrel to a support rod connected to a circular die through which the tubular unstretched film is extruded.

The stretching temperature is a temperature which causes orientation by stretching, and as is known, this temperature has a relatively wide range and can be readily defined by those skilled in the processing of plastic films. Generally, the stretching temperature is within a range slightly lower than the melting point of the resin used. In the case of mandrel stretching, since the film is stretched in the condition that it is in contact with the mandrel, the stretching temperature (Ts) (°C.) is suitable to control so as to satisfy the following equation:

$$Tm - 50 \leq Ts \leq Tm - 5$$

(where Tm (°C.) is a melting point of a resin). The unstretched film may be heated to the stretching temperature either internally through the mandrel or externally. However, in order to achieve uniform heating, at least the interior of the film is preferably heated.

In the mandrel stretching method, when the tubular film leaves the mandrel after its biaxial stretching is substantially completed, a gas, typically air as in the prior art technique, is blown from the outside of the film so as to cool it, and at the same time, a gas is continuously blown into the tube of the film so that the gas penetrates through the film and goes outside.

It is difficult to determine the exact volume of the gas to be blown into the tube of the film since it varies with the properties and shape of the stretched film, the stretching speed, as well as the temperature and volume of the cooling gas. Generally, a suitable value is selected from the range of 0.1 to 150 Nl/m$^2$.min, preferably 1 to 70 Nl/m$^2$.min, at 20° C., provided that the tube of the film maintains a diameter substantially equal to the value obtained upon completion of the biaxial stretching. A film whose air permeability increases gradually can be produced by introducing an increasing amount of the gas into the tube while more cooling gas is blown over the outside of the film at the same time. Air is the most common as the gas to be blown into the tube of the film. The gas is blown into the tube of the film through a conduit which is connected to an external pressurized container and penetrates through a circular die, the mandrel supporting rod and the mandrel interior and which opens at the larger diameter end of the mandrel.

The air-permeable film produced by the present invention can be provided with desired physical properties by controlling the type of the polyolefin resin and its physical property, the type of the inorganic filler and its particle size and filling ratio, the type of the fatty acid ester and its compounding ratio, the stretching direction, the stretching temperature, the stretching ratio, etc. For films having a thickness ranging between 25 and 150 μm, a preferred air permeability is in the range of 25 to 30,000 seconds/100 cc as measured according to JIS P 8117, and a preferred moisture permeability is in the range of 300 to 25,000 g/m$^2$.24 hrs as measured according to JIS Z 0208. If the thin film is to be formed, its thickness is preferably not more than 60 μm, with 50 μm or less being particularly preferred.

In accordance with the process of the present invention, the fatty acid ester is compounded to the composition comprising the polyolefin resin and the inorganic filler, and thus an air-permeable film having good soft touch can be obtained. Moreover, since the thickness of the film can be decreased and made uniform at a low stretching ratio, the film can be provided with more increased soft touch.

The present invention is hereunder described in greater detail with reference to the following examples although it is not intended to be limited thereto.

EXAMPLE

Experiment 1-1

A powder (65 vol %) of an ethylene-butene-1 copolymer (butene-1 content: 6 wt %; density: 0.923 g/cm$^3$; MFR: 0.9 g/10 min) and 35 vol % of heavy calcium carbonate (average particle diameter: 1.2 μm; irregular form other than plate and rod forms), 0.1 part by weight of a heat stabilizer (2,6-di-tert-butyl-p-cresol) per 100 parts by weight of the ethylene-butene-1 copolymer, 1.0 part by weight of a dispersant (oleic acid) per 100 parts by weight of the heavy calcium carbonate, and 5 parts by weight of purified castor oil (containing more than 85% of glycerol triricinolate; produced by Ito Seiyu Co., Ltd.) per 100 parts by weight of the total weight of the above ingredients were mixed for 5 minutes in a super mixer, extruded at 200° C. in a strand form through a twin screw extruder, and then pelletized.

The pellets were extruded at 210° C. from a T-die provided to an extruder (screw diameter: 50 mm; L/D: 25) and then cooled and solidified on a cooling roll the surface temperature of which was maintained at 25° C. to produce a 50 μm thick film. This film was then uniaxially stretched at a stretching temperature of 80° C. and a stretching ratio of 2 by the roll stretching method to produce a 35 μm thick air-permeable film.

The appearance and physical properties of the air-permeable film thus produced are shown in Table 1. The moisture permeability was measured according to JIS Z 0208.

Experiment 1-2

A 35 μm thick stretched film was produced in the same manner as in Experiment 1-1 except that the purified castor oil was not used.

The results of evaluation of the film are shown in Table 1.

Experiment 1-3

An air-permeable film was produced in the same manner as in Experiment 1-1 except that in place of the ethylene-butene-1 copolymer, a mixture of 95 wt % of the same ethylene-butene-1 copolymer and 5 wt % of (branched chain) low density polyethylene (density: 0.925 g/cm$^3$; MFR: 2.8 g/10 min) was used.

The results of evaluation of the film are shown in Table 1.

Experiment 1-4

An air-permeable film was produced in the same manner as in Experiment 1-3 except that the proportions of the ethylene-butene-1 copolymer and the low density polyethylene were changed to 75 wt % and 25 wt %, respectively.

The results of evaluation of the film are shown in Table 1.

Experiment 1-5

An air-permeable film was produced in the same manner as in Experiment 1-4 except that the amount of the purified castor oil compounded was changed to 10 parts by weight.

The results of evaluation of the film are shown in Table 1.

Experiment 1-6

An air-permeable film was produced in the same manner as in Experiment 1-4 except that the proportions of the ethylene-butene-1 copolymer and the low density polyethylene were changed to 55 wt % and 45 wt %, respectively, and the amount of the purified castor oil compounded was changed to 15 parts by weight.

The results of evaluation of the film are shown in Table 1.

Experiment 2

A 52 μm thick film was produced in the same manner as in Experiment 1-1. This film was stretched in the longitudinal direction at a stretching temperature of 80° C. and a stretching ratio of 1.5 by the roll stretching method, and then stretched in a transverse direction at a stretching temperature of 130° C. and a stretching ratio of 2.5 by passing through a tenter to produce a 35 μm thick air-permeable film.

The results of evaluation of the film are shown in Table 1.

TABLE 1

| Experiment | Thickness (μm) | Density (g/cm³) | Moisture Permeability (g/m² · 24 hrs) | Tensile Modulus (kg/cm²) | Evenness of Thickness* | Soft Touch** |
| --- | --- | --- | --- | --- | --- | --- |
| 1-1 | 35 | 1.12 | 5,000 | 1,480 | Δ | Δ |
| 1-2 | 35 | 1.19 | 2,000–5,000*** | 1,770 | X | X |
| 1-3 | 35 | 1.12 | 5,000 | 1,200 | O | O |
| 1-4 | 35 | 1.16 | 4,900 | 1,100 | ◎ | ◎ |
| 1-5 | 35 | 1.19 | 4,200 | 1,090 | ◎ | ◎ |
| 1-6 | 35 | 1.21 | 1,800 | 920 | ◎ | ◎ |
| 2 | 35 | 0.61 | 8,000 | 800 | ◎ | ◎ |

* ◎: Very even, O: Even, Δ: Somewhat uneven, X: Uneven
** ◎: Very good, O: Good, Δ: Poor, X: Bad
***Variations due to uneven stretching are great.

Experiment 3-1

The same composition as used in Experiment 1-1 was pelletized. These pellets were extruded at 210° C. from a circular die (4-thread spiral die having a lip diameter of 75 mm and a lip gap of 1 mm) provided to an extruder (screw diameter: 50 mm; L/D: 25), and then the film formed was brought into contact with a cooling mandrel (diameter: 100 mm) in the inside of which water maintained at 5° C. was circulated, and cooled and solidified at a blow ratio of 1.33. The thus-formed 130 μm thick tubular unstretched film was pulled at a rate of 4 m/min.

The above film was heated to 110° C. on a preheating mandrel (diameter: 98 mm) connected below the cooling mandrel. Thereafter, the film was stretched to 3.0 times in the longitudinal direction while stretching to 2.5 times in the transverse(circumferential) direction along the sand-blasted surface (asperities: 0.5 μm) of a truncated-conical mandrel (diameter of the one end connected to the preheating mandrel: 98 mm; diameter of the other end: 250 mm; cone angle: 90°) maintained at 110° C. Subsequently, over the entire outer surface of the above biaxially stretched tubular film leaving the mandrel, cooling air (15° C.) was blown at a rate of 10 m/sec from an air ring (diameter: 350 mm; lip gap: 3 mm) positioned 50 mm below the bottom of the mandrel. At the same time, air (20° C.) was continuously blown into the tube of the film at a rate of 40 Nl/m².min from a conduit also positioned beneath the mandrel. As the air was forced to escape through the film, the tubular film was continuously pulled by nip rolls.

The appearance and physical properties of the air-permeable film thus obtained are shown in Table 2.

The moisture permeability was measured by JIS Z 0208; the air permeability, by JIS P 8117; and the tear strength, by JIS Z 1702.

Experiment 3-2

An air-permeable film was produced by stretching under the same conditions as in Experiment 3-1 except that the thickness of the tubular unstretched film was adjusted to 70 μm.

The results of evaluation of the film are shown in Table 2.

Experiment 3-3

An air-permeable film was produced in the same manner as in Experiment 3-1 except that an ethylene-propylene-butene-1 copolymer (propylene content: 4 wt %; butene-1 content: 3 wt %; density: 0.918 g/cm³; MFR: 0.70 g/10 min) was used in place of the ethylene-butene-1 copolymer; methylacetyl ricinolate (produced by Ito Seiyu Co., Ltd.) was used in place of glycerol triricinolate; a blowing rate of the cooling air on the tubular biaxially stretched film was changed to 5 m/sec; and the blowing rate of air into the tubular film was changed to 20 Nl/m².min.

The results of evaluation of the film are shown in Table 2.

Experiment 3-4

Stretching was conducted in the same manner as in Experiment 3-2 except that glycerol triricinolate was not added.

The results of evaluation of the film are shown in Table 2.

TABLE 2

| Experiment | Thickness (μm) | Density (g/cm³) | Moisture Permeability (g/m² · 24 hrs) | Air Permeability (sec/100 cc) | Tear Strength (longitudinal direction/ circumferential direction) (g/g) | Evenness in Thickness in the Circumferential Direction* | Soft** Touch |
| --- | --- | --- | --- | --- | --- | --- | --- |
| 3-1 | 49 | 0.57 | 5,000 | 200 | 8/8 | ◎ | ◎ |
| 3-2 | 25 | 0.58 | 8,000 | 150 | ¾ | O | O |
| 3-3 | 43 | 0.62 | 3,000 | 700 | 12/13 | ◎ | ◎ |
| 3-4 | —*** | —*** | —*** | —*** | —*** | X | X |

* ◎: Very even, O: Even, Δ: Somewhat uneven, X: Uneven
** ◎: Very good, O: Good, Δ: Poor, X: Bad
***Breakage often occurred during stretching, and no evaluation was made.

In accordance with the process of the present invention, an air-permeable film having soft touch can be obtained. Moreover, since the thickness of the film can be decreased and made uniform even at a low stretching ratio, an air-permeable film having more improved softness like cloth can be obtained.

While the invention has been described in detail and with reference to specific embodiments thereof, it will be apparent to one skilled in the art that various changes and modifications can be made therein without departing from the spirit and scope thereof.

What is claimed is:

1. A process for producing a soft, air-permeable film having substantially uniform thickness, which comprises stretching in at least one direction a film made of a composition comprising 42 to 87 vol % of a polyolefin resin and 58 to 13 vol % of an inorganic filler wherein an aliphatic alcohol/fatty acid ester of a fatty acid having 10 to 22 carbon atoms and an aliphatic alcohol having 1 to 12 carbon atoms is further added to the above composition in an amount of 3 to 25 parts by weight per 100 parts by weight of the composition.

2. The process as claimed in claim 1, wherein the polyolefin resin is an ethylene-α-olefin copolymer having a density of 0.910 to 0.940 g/cm$^3$ and a melt flow rate of 0.1 to 5 g/10 min.

3. The process as claimed in claim 1, wherein the polyolefin resin is a mixture of an ethylene-α-olefin copolymer having a density of 0.910 to 0.940 g/cm$^3$ and a melt flow rate of 0.1 to 5 g/10 min and a high density polyethylene having a density of not less than 0.941 g/cm$^3$ and a melt flow rate of not more than 1.0 g/10 min.

4. The process as claimed in claim 1, wherein the polyolefin resin is a mixture of an ethylene-α-olefin copolymer having a density of 0.910 to 0.940 g/cm$^3$ and a melt flow rate of 0.1 to 5 g/10 min and a low density polyethylene having a density of 0.910 to 0.928 g/cm$^3$ and a melt flow rate of 0.3 to 10 g/10 min.

5. The process as claimed in claim 1, wherein the inorganic filler has an average particle size of 0.1 to 5 μm.

6. The process as claimed in claim 1, wherein the ester is an ester of ricinolic acid and glycerol.

7. The process as claimed in claim 1, wherein the stretching ratio in one direction is 1.2 to 6.

8. The process as claimed in claim 1, wherein the stretching is biaxial stretching.

9. The process as claimed in claim 8, wherein said stretching comprises biaxially stretching a tubular unstretched film which film is guided along a truncated-conical mandrel, and subsequently cooled by blowing a gas from the outside thereof, while at the same time a gas is continuously blown into the tube of the film so that the gas penetrates through the film and goes outside thereof.

10. The process as claimed in claim 9, wherein said gas is blown into the tube of the film through a conduit which is connected to an extrenal pressurized container and penetrates through a circular die, a mandrel supporting rod and the mandrel interior and which opens at a larger diameter end of the mandrel.

11. The process as claimed in claim 2, wherein said ethylene-α-olefin copolymer comprises 1 to 20 wt. % of an α-olefin having a $C_3$–$C_8$ molecular skeleton and 99-80 wt. % of ethylene, which copolymer is prepared by copolymerizing ethylene and at least one α-olefin having a $C_3$–$C_8$ molecular skeleton in the presence of a catalyst.

12. The process as claimed in claim 1, wherein said polyolefin is selected from the group consisting of low density polyethyelene, high density polyethyelene, polypropylene and an ethylene-α-olefin copolymer.

13. The process as claimed in claim 12, wherein said polyolefin is a high density polyethylene having a density of at least 0.941 g/cm$^3$ and a melt flow rate of not more than 1.0 g/10 min.

14. The process as claimed in claim 12, wherein said polyolefin is low density polyethylene having a density of 0.910–0.928 g/cm$^3$ and a melt flow rate of not more than 0.3–10 g/10 min.

15. The process as claimed in claim 12, wherein said polyolefin is a polypropylene having a melt flow rate of 0.5–10 g/10 min.

16. The process as claimed in claim 1, wherein said fatty acid has 12-18 carbon atoms, and said aliphatic alcohol has 1-6 carbon atoms.

17. The process as claimed in claim 1, wherein said fatty acid is selected from the group consisting of lauric acid, myristic acid, palmitic acid, stearic acid, oleic acid, linolic acid, linolenic acid and ricinoleic acid.

18. The process as claimed in claim 1, wherein said aliphatic alcohol is selected from the group consisting of methyl alcohol, ethyl alcohol, butyl alcohol, ethylene glycol, propylene glycol, glycerol, pentaerythritol and sorbitol.

19. The process as claimed in claim 9, wherein said stretching is effected at a temperature satisfying the following equation:

$$Tm-50 \leq Ts \leq Tm-5$$

wherein Ts is the stretching temperature, and Tm is the melting point in degrees C. of the resin.

20. The process as claimed in claim 9, wherein the gas blown into the tube of the film is blown at a volume in the range of 0.1-150 Nl/m$^2$.min.

* * * * *